United States Patent [19]

Olson

[11] 4,227,902
[45] Oct. 14, 1980

[54] BENCH STRUCTURE WITH DUST COLLECTOR

[75] Inventor: Donald F. Olson, St. Charles, Ill.

[73] Assignee: St. Charles Manufacturing Co., St. Charles, Ill.

[21] Appl. No.: 823,049

[22] Filed: Aug. 8, 1977

[51] Int. Cl.² .............................................. B01D 46/04
[52] U.S. Cl. ............................... 55/302; 55/DIG. 18; 55/DIG. 29; 55/472; 55/419; 51/273; 82/34 R
[58] Field of Search .......................... 55/467, 470–473, 55/DIG. 29, DIG. 18, 302, 419; 51/166 R, 273, 270, 240; 82/DIG. 1, 34 R

[56] References Cited

U.S. PATENT DOCUMENTS

| | | | |
|---|---|---|---|
| 2,280,498 | 4/1942 | Morris | 51/166 R |
| 2,347,334 | 4/1944 | Schmieg | 5/DIG. 18 |
| 2,999,448 | 9/1961 | Abler | 55/DIG. 29 |
| 3,098,332 | 7/1963 | Sutton | 51/270 |
| 3,559,383 | 2/1971 | McCabe | 55/472 |
| 3,880,061 | 4/1975 | Hensiek et al. | 55/DIG. 29 |
| 3,902,999 | 9/1975 | Hawley | 55/467 |
| 4,007,026 | 2/1977 | Groh | 55/302 |

Primary Examiner—Bernard Nozick
Attorney, Agent, or Firm—Robert E. Wagner; Gerald T. Shekleton

[57] ABSTRACT

A laboratory bench assembly having work stations which are retractable into the interior of the bench to provide a clear and unobstructed bench space when not in use; an air flow is created within said bench by a blower, the air flow carrying dust particles from each work station through a conduit into a cartridge-type filter which traps and collects the dust particles; a jet shoots a blast of high pressure air into said filter for cleaning purposes.

7 Claims, 13 Drawing Figures

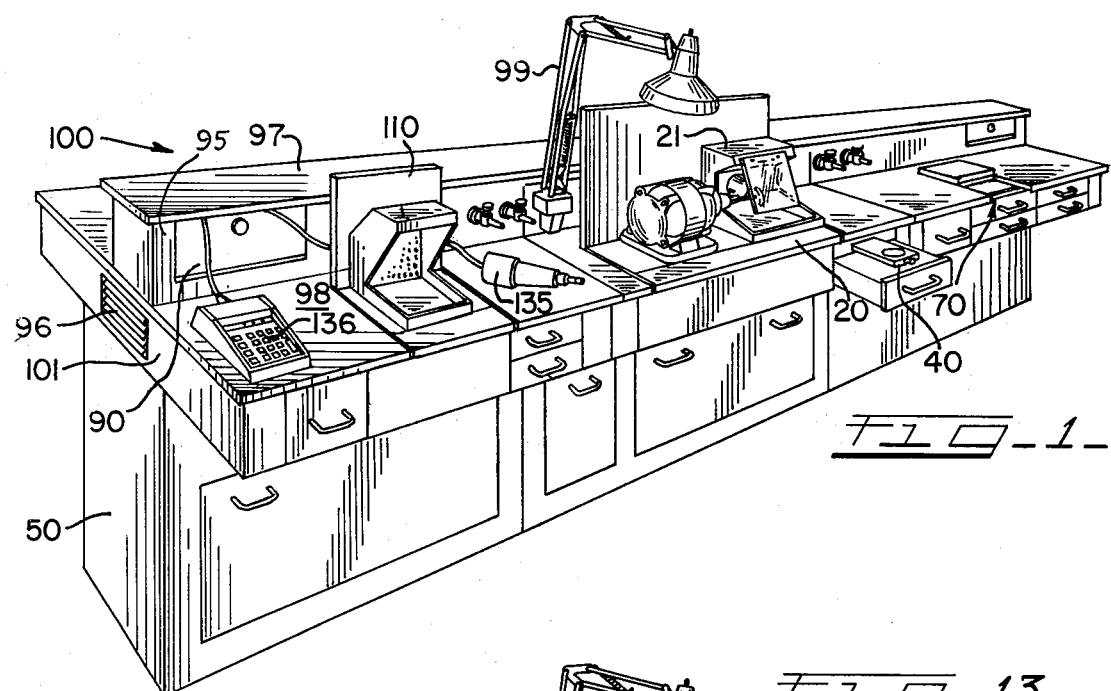
FIG_1_
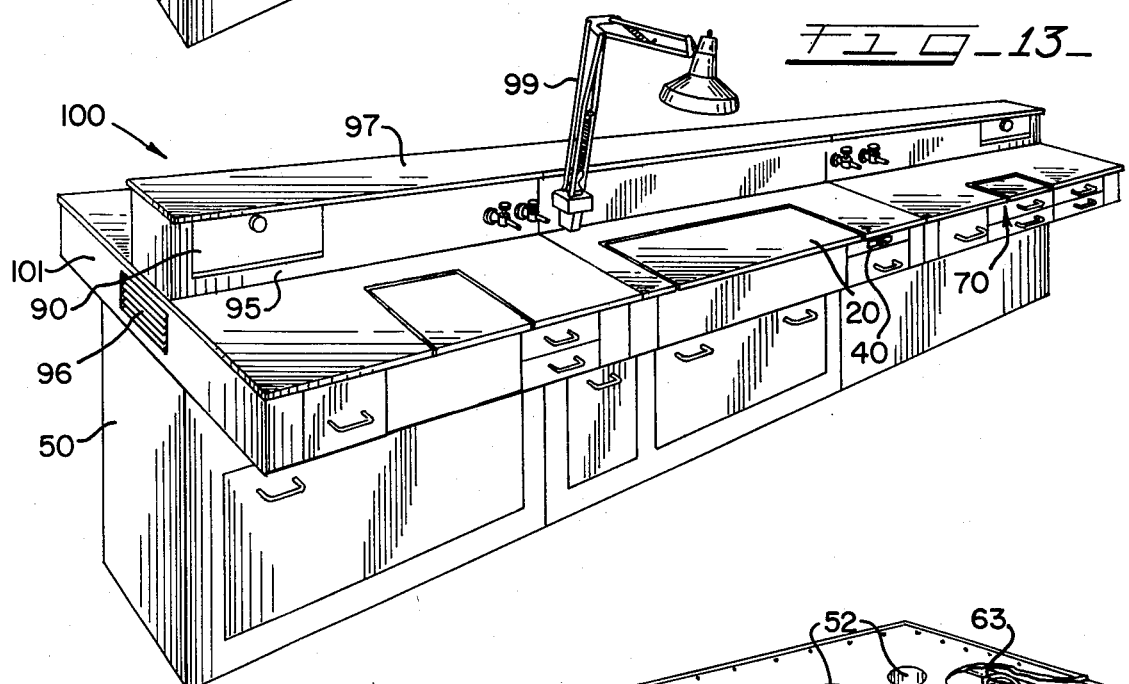
FIG_13_
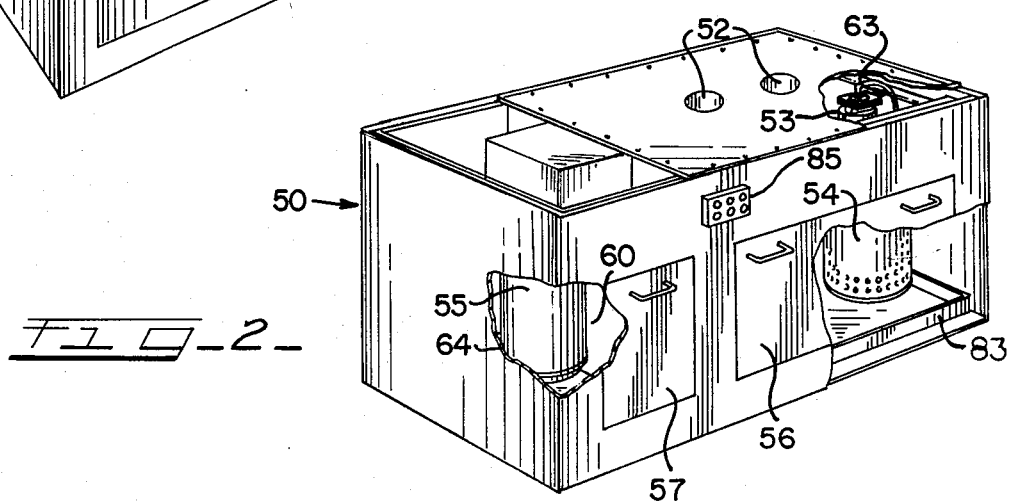
FIG_2_

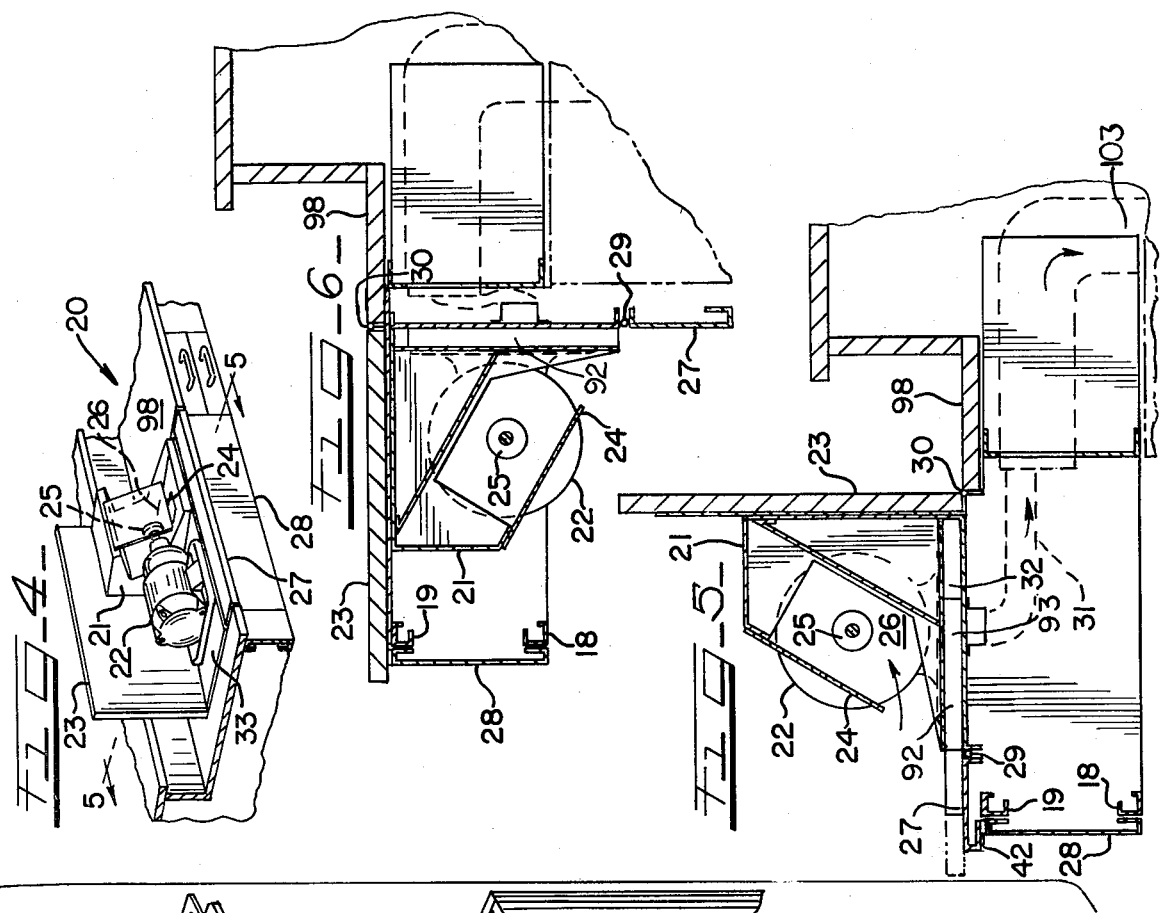
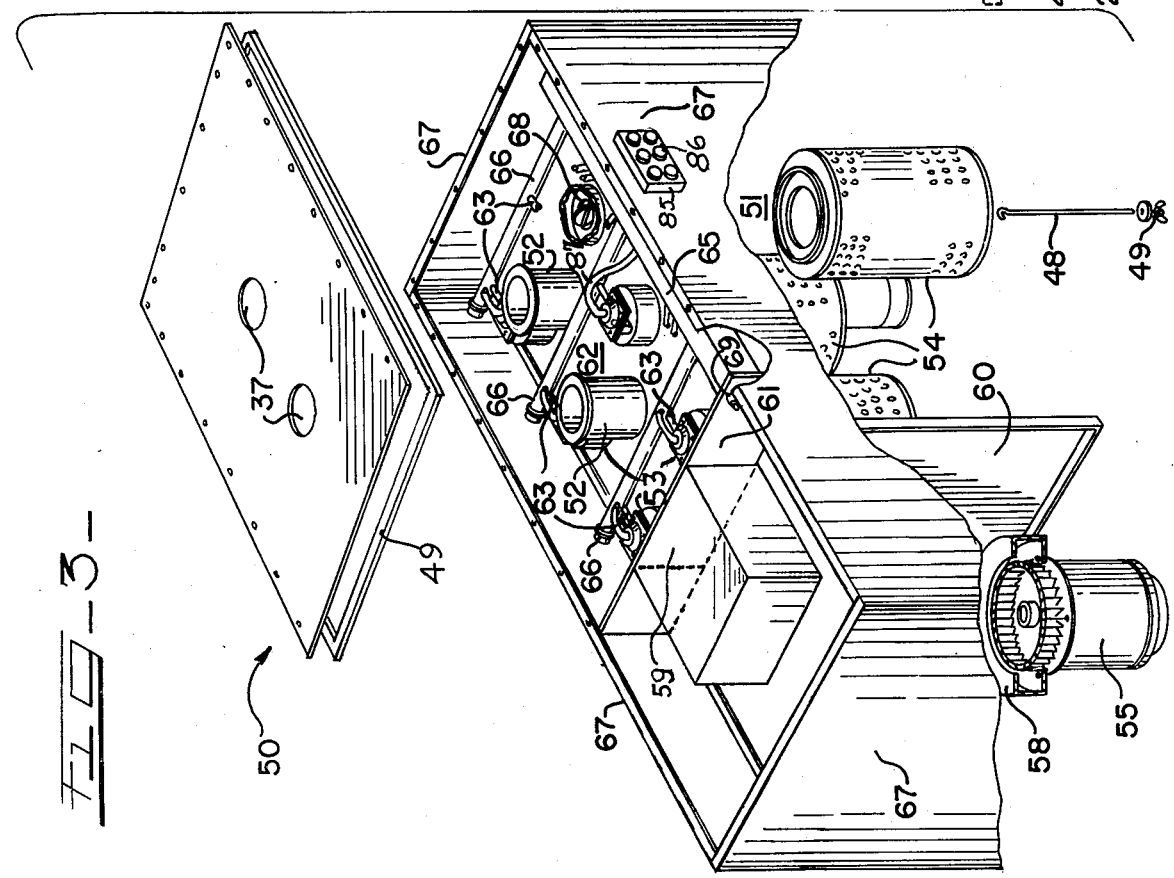

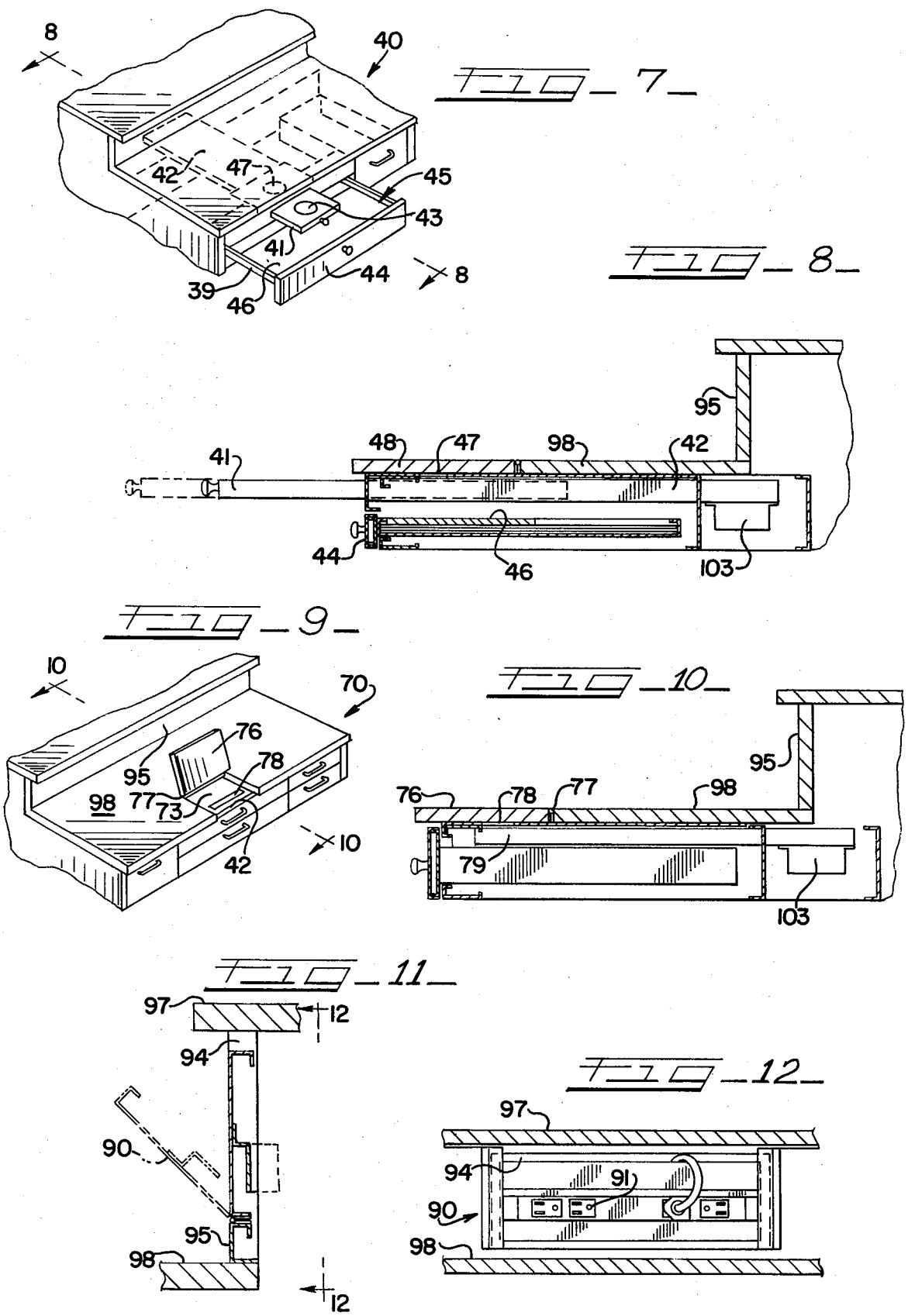

BENCH STRUCTURE WITH DUST COLLECTOR

BACKGROUND OF THE INVENTION

This invention is related to laboratory bench assemblies, and more specifically, to a dental laboratory bench having novel exhaust hoods for use with various grinding stations.

In the finishing and polishing of dentures and the like it has been found desirable to collect as much of the precious metal dust which the lathes would grind away during the polishing and finishing process for later salvage of the precious metal as well as retaining a clean environment in the laboratory. In the past, this dust has been collected through dust hoods which were simply conduits connected to a source of negative air pressure. The dust-laden air would flow through a filter and out an exhaust to the open air. The hoods and lathes were permanent and fixed and took up considerable bench space. The dust was collected in a filter which was normally a conventional cloth bag or simply a rectangular disposable filter. By either method, the precious metal dust collected from various stations was combined into a single air flow which made a pass through a single series of filters trapping the precious metal and other dust particles in the filter, the air flow being exhausted. Thus, the air intake of a plurality of stations was combined into one air stream to go through the filter. Of course, with such arrangement the filter of the prior art dust became frequently clogged and in need of replacement, as it constituted a single pathway for the whole of the dust thus collected. Mechanical shakers were employed to dislodge some of the dust to extend the life of the filters somewhat. This practice proved to be rather inefficient, dislodging only the large dust particles, leaving the smaller particles still blocking the air flow.

SUMMARY OF THE INVENTION

Therefore, an object of the subject invention is a laboratory bench having a new and improved dust collector for the efficient collection of precious metal dust.

Another object of the subject invention is the provision of a means for providing a relatively unobstructed bench table surface when the respective grinding and polishing stations are not in use on the bench.

A further object of the subject invention is the provision of an efficient means for the collection of the precious metal dust from the filters in such a manner as to allow an extended use of the filters.

Still another object of the subject invention is the use of a plurality of filters, each of which may be cleaned with a blast of highly pressurized air to allow a greater capacity and longer life of the filters.

These and other objects are attained in accordance with the present invention wherein there is provided a lab bench primarily for use in dental laboratories. This lab bench may incorporate various work stations, each station having an exhaust hood particularly constructed to most efficiently collect the previous metal dust which might otherwise be lost during grinding and polishing operations at such work stations. These work stations are retractable into the interior of the bench, thereby freeing the bench table surface for other purposes when the grinding stations are not in use. Thus, the lathe and exhaust hood for the lathe are mounted on a support panel which is pivotal at one end, thereby allowing the lathe and its hood to retract into the interior of the bench when not in use.

Counter exhaust hoods may also form an integral retractable part of the bench, being pivotal on one side and capable of being opened to allow the flow of air through an exhaust duct. As with the lathe, this counter exhaust is also retractable to present a clean and open bench space when not in use. A drawer and telescoping exhaust hood allows an operator or technician to enclose his work area on five sides by working within a drawer. The air flow is directed to the rear of the drawer, where it is in communication with the exhaust duct, thereby drawing all dust generated at the work station to the exhaust duct, as within the other work stations.

The counter itself, with its drawers and retractable hoods, may be mounted on a base which contains the blower and filter means. The base is generally formed into two main compartments; a filter compartment and an air exhaust compartment. The bench exhaust hoods direct the dust-laden air stream through conduits to the filter of the base through inlet ports. Each of these inlet ports has a valve to restrict the backflow of the dust-laden air through the ports when cleaning the filter. Upon passing through an inlet port into the filter compartment, the dust-laden air is drawn through a filtering means where it loses its dust content. The clean air then passes to the exhaust compartment where a fan or blower thrusts the cleansed air into the room or wherever else desired. The filtering means may be of a disposable cartridge nature that can easily be replaced with another when full. The filter would then be processed for reclamation of the gold or other precious metals which it would have collected.

At the bottom of the bench base may be placed a removable pan. Within each inlet port is a high pressure air gun connected to an outside source of pressurized air. At regular scheduled intervals the valves are closed and the high pressure gun is activated to blast a stream or jet of air into the filter, dislodging much of the collected dust into the filter compartment causing the dust to drop by gravity into the removable pan beneath. In this manner, the useful life of the filter is greatly extended and the precious metals thereby collected may be easily melted down for reuse. The base incorporates easily removable side and front panels thereby facilitating easy service for the blower motor and easy removal and collection of the precious metal dust through either the removal of the pan or the replacement of the filter cartridges, as necessary.

Further objects of the invention, together with additional features contributing thereto and advantages accruing therefrom, will be apparent from the following description of one embodiment of the invention when read in conjunction with the accompanying drawings wherein:

DESCRIPTION OF THE DRAWINGS

FIG. 1 is a perspective view of the laboratory bench of the subject invention, showing the work stations in the operational mode;

FIG. 2 is a partially cut-away perspective view of the base of the laboratory bench of FIG. 1 showing filter inlets, the jets, the filtering compartment and the exhaust compartment of the subject invention;

FIG. 3 is an exploded isometric view of the laboratory bench base of FIG. 2 showing the interior of the exhaust chamber, filter cartridges and exhaust blower and motor of the subject invention;

FIG. 4 is an expanded front perspective view of the grinding station shown in FIG. 1;

FIG. 5 is a side view taken along the line 5-5 of FIG. 4 showing the grinding station in an open position;

FIG. 6 is a side view showing the grinding station of FIGS. 4 and 5 in a closed position, thereby leaving an unobstructed bench counter;

FIG. 7 is a side view taken along the line 7-7 of FIG. 6 showing the telescoping exhaust vent of the subject invention in an open position;

FIG. 8 is a front perspective view of one embodiment of the telescoping exhaust vent;

FIG. 9 is a front perspective view of one embodiment of a countertop exhaust vent of the subject invention;

FIG. 10 is a side view taken along the line 10-10 of FIG. 9 showing the upraised hinged countertop exhaust hood and the open drawer of the subject invention;

FIG. 11 is a side view of the countertop utility panel showing the panel in the closed position;

FIG. 12 is a rear view of the utility panel of the subject invention; and,

FIG. 13 is a perspective view of the laboratory bench of the subject invention showing each work station in the closed or non-operational position, appropriate for conventional laboratory use.

DESCRIPTION OF THE INVENTION

Referring to FIGS. 1 and 3, there is shown a laboratory bench 100 having a top fixed bench counter 98 and an upper shelf 97 for the storage of utensils, reagents, samples and the like. A lamp 99 may be positioned where desired and may be of the type shown, i.e., extensible and adjustable to provide sufficient lighting on any specific area within a given radius from the point of its attachment to the bench.

The bench 100 may have a lathe work station 20. A lathe exhaust hood 21 is positioned surrounding the lathe work area so as to collect all the dust generated by the lathe during grinding and polishing operations. A hood work station 110 may also be a part of the bench 100, with the exhaust hood pivotal for storage in the bench interior when not in use. A telescoping work station 40 can be constructed to allow a technician to comfortably set on a stool and grind articles in his lap without the loss of any dust. In addition, a countertop exhaust 70 may be provided integral with the countertop 98, which, upon swinging the hinged countertop portion up, establishes connection with the exhausting air flow to thereby collect the dust particles generated at the work station when in use.

Each of these work stations, the lathe work station 20, the hood work station 110, the countertop work station 70, and the telescoping exhaust station 40, are retractable into the interior of the bench unit 100 to present an unobstructed countertop as shown in FIG. 13. In this manner, the bench unit 100 may present selected open and clear space on the countertop 98 to a technician when the respective work stations are not in use, thereby allowing a more efficient use of the bench, a particular work station being convertible to other widely variant uses when its normal function is not needed at that point in time.

The laboratory bench unit 100 comprises an upper work area structure 90, mounted on a lower support base structure 50. The lower supportive structure 50 may contain storage areas in addition to housing the means for directing the flow of air from each of the exhaust hoods through the filters and out the exhaust port 96. As used herein, an exhaust hood represents a partially enclosed area which directs the flow of air to a source of suction to eventually reach a blower means where it is exhausted. The upper counter structure 90 may be T-shaped, having counters on opposite sides or merely an inverted L-shape having counters on one side only. Of course, with the T-shape, the work stations may be duplicated on the opposite side if desired, having each exhaust hood connected to a common air flow source within the base unit 50.

The supportive base unit 50, shown in FIG. 2, has a blower unit 55 which, in one embodiment, employs one and a half horse power motor driving a fan in housing 58 to exhaust the air within the exhaust compartments 64 and 62 out an exhaust port (not shown). The exhaust compartment is divided into a filter exhaust area 62 and blower area 64 by a panel 61. The panel has an opening 59 through which the filtered air may pass from filter exhaust area 62 to the blower compartment 64, under the impetus of the blower. Thus, the exhaust blower, drawing the air through the opening 59 creates a negative pressure in the filter exhaust area 62, shown in FIG. 3, thereby drawing air through each individual filter unit 54 and up through filter ports 53 to the exhaust area. These filter units 54 are replaceable cartridge-types, such as found in automobiles and the like, and may be attached to each filter port 53 with appropriate means such as hanging rod 48 and wing nut 49.

The filter compartment 51 of the base 50 draws dust-laden air from each respective exhaust hood of the counter portion 90 of a bench 100 through inlet openings 52. The entering dust-laden air is drawn into the filters 54 where the dust is trapped and the cleaned air passes into the exhaust compartment 62. As shown in FIG. 2, the base unit 50 is adapted to service two exhaust hoods or vents, having only two inlet openings 52. Should more capacity be desired, more inlet openings 52 can be formed in the base unit 50, such as on the sides, at a point where direct entry can be made to the filter compartment 51, to accommodate the additional exhaust vents. Up to six work stations can be serviced by one base unit 50 in this manner.

A jet 63 is attached above each of the filter ports 53 in combination with a butterfly or other suitable valve 68. The jets are connected through conduit means 66 to a manifold 65 which itself may be connected by inlet fitting 69 to an outside source (not shown) of highly pressurized air. Thus, through the use of exterior control panel 85, after the closing of the filter ports 53 through valves 68, a blast of high pressure air may be directed through the filter ports 53 by jets 63 for the dislodgment of the dust, including the precious metal dust from the filters 54. The dust which is dislodged by the jets 62 will settle by gravity onto the removable collection pan 47 from which it might be easily recovered and salvaged. During the blasting by the jet 63, the closed valves 68 prevent the back flow of the dislodged precious metal dust into the inlet chamber 62, thereby directing all force generated by the jet 63 within the filter cartridge 54 out to the filter chamber 51.

The control panel 85 may include push button valves. Each push button 86 is connected to a jet 63 by plastic tubing 87 or similar conduit means, preferably in an order allowing an easy visual indication of which button is connected to each jet. Thus, on pushing a button 86, the jet 63 is opened to blast the high pressure air as described above.

This blasting operation allows the useful life of each filter cartridge to be extended in a much more efficient manner than the prior art method of shaking the filters to dislodge the dust. Whether it be manually or by automated means, it is within the common experience of those skilled in the art that shaking the filters for the dislodgment of the dust is very inefficient and accomplishes little toward the prolongation of the filter life. By the blasting operation outlined above, the filter cartridges 54 may be cleaned repeatedly. Eventually, of course, the buildup of dust becomes restrictive to the air flow so that the filter may not be cleaned in this manner any further and must therefore be replaced. In addition, while the blast from the jets 63 should be as great as possible to dislodge as much dust as practical, it should not be so high as to rip or otherwise harm the integrity of the filter.

Inlet port openings 37 are also formed with top base panel 35 to provide an entrance to the inlet ports or openings 52 from the conduits connecting to the exhaust hoods on bench counter portion 101. The top panel 35 fits over the side panels 67 of the base unit 50. Removable lower side base panels 56 and 57 allow easy access to the filter compartment 51 and the blower motor compartment 64 for repair or replacement. The removable dust pan 83 may also be taken out after removing panel 56. The entire base unit 50 is made substantially airtight by caulking all joints and placing resilient sealing material 49, such as foam or felt tape, between adjoining panels.

The upper counter portion 101 is placed and secured over the lower base portion 50, resting on structural framework 19, as will be shown, in such a manner as to allow the exhaust to exit from the exhaust compartment 64 to suitable conduit means leading to the outside exhaust port 96. The inlet openings 37 and adapters 52 are also connected by suitable conduit means as will be hereinafter explained, to each of the several work stations 20, 40, 70 and 110 to allow the flow of dust from the respective work stations to the filtering area.

The lathe work station 20 includes a lathe 22 for rotating a grinding bit 25. The lathe 22 is mounted on support panel 33 with a back panel 23. As shown in FIG. 4, an exhaust hood 21 directs the dust from the grinding operation in the work area 26 and the exhaust flow through an opening 32 to a flexible duct 31 or conduit means as indicated by the arrows in FIG. 5. The dust is driven by the exhaust flow from the work area 26 through the conduit means 31 and integral passageway 103 into the base plenum area 62 through inlet ports 37 and adapters 52. The provision of a transparent shatter-resistant plate 24 allows protection for the operator from the flying bits of dust generated by the grinding process and also serves to further direct the dust into the flexible conduit means 31. The lathe grinding station 20 is affixed to the counter 98 of the bench 100 in a retractable manner. When in the up or work position of FIGS. 4 and 5, an outer panel 27 rests on the upper structural framework 19 of the bench 100. A front blank panel 28 is joined to the framework structure 19 for giving the bench a pleasant appearance.

The hood 21 itself may have two exhaust vents, one being closed while the other is in use. Closure of either vent may be effected by placement of a movable cover 92 over the vent. Thus, when using the lathe bit 25 for grinding, the front vent 93 is closed by cover 92, directing the air flow through the rear vent 33. The use of a hand drill, such as shown in FIG. 1 and depicted by number 135, will make it more convenient to use the front vent 93. Therefore, the movable cover 92 is positioned over the rear vent 33, directing the air flow through the front vent, and better collecting the dust generated by the hand grinding because of its proximity to the locus of such grinding. As shown in FIGS. 5 and 6, the movable cover 92 is a telescoping vent operating similar to the telescoping exhaust hood, described in more detail below.

When not in use, the lathe work area may be retracted to the interior of the bench 100 as shown in FIG. 6. This is accomplished by the simple expedient of lifting the front panel 27 and, thereby the entire work station 20, upwardly about the hinge or pivotal point 30 until a position is reached whereby holding the work station 20 by support panel 33, the front panel 27 may be pivoted downwardly about the hinge or pivotal point 29 to clear the upper structural portion 19 of the bench. Having cleared this upper structural portion 19, the entire lathe assembly 22 and hood 21 of the work station 20 is lowered gently to the interior of the bench. The flexible duct 31 is compressed, reducing its length by the lowering of the lathe work station 20. The countertop 23 is pivoted downwardly about the point 30 until it comes to rest upon the upper structural portion 19 of the bench 100, thereby presenting flat and unobstructed countertop portions 98 and 23 (FIG. 6). Concurrently, the vacuum flow to that work station is shut off by virtue of the closing of the station.

To place the lathe 22 in a position suitable for use, one simply reverses this procedure by grasping the countertop portion 23 and pivoting it upward. The front counter portion 27 naturally pivots downwardly about the pivotal point 30 through the forces of gravity, thereby naturally clearing the front structural portion 19 of the bench. Once above this structural portion 19, the front bench portion 27 is pivoted to a 180 degree angle with the lathe structural portion 33 and the entire work station 20 is dropped downwardly to rest in an operative position upon the bench structural portion 19.

Should one desire a hood similar to that used with the lathe 22 but for use only with hand grinding, the work station 110 shown in FIG. 1 may be employed. While this work station 110 does not have the lathe, it is similar in all other respects, having the capability to retract to the interior of the bench.

The telescoping exhaust hood 40 comprises a work area 45 in which a technician may work in, to grind or polish an object such as dentures and the like when sitting on a stool in front of the bench. The work area 45 is substantially enclosed and restricts the large particles of dust to the work area 45 by reason of the sidewalls 39 of the drawer (FIG. 7). When closed (FIG. 9), the drawer appears normal with no outward features to distinguish it from adjacent drawers. The telescoping air chamber or exhaust comprises a tray 41 which is slidingly retractable into a larger sleeve or main air chamber 42 in a telescoping arrangement. A screened vent 43 is extended outward of the bench. By such exposure an air stream is established into the tray through the main air chamber 42 and into the conduit 103 leading to the filter base 50. The drawer 44 may be opened to allow the technician to rest his elbows and/or tools on the wooden tray portion 46. The drawer may be opened to its fullest extent to catch downward escaping dust particles within the drawer confines.

It may be desirable to work on the bench with the telescoping air chamber. For such use a screened bench vent 47, similar to vent 43 may be provided. Access to this bench vent is accomplished through a hinged portion of the bench 48 which will pivot backward and lay flat on the bench counter top 98 when in use. By telescoping the air chamber 41 outward the vent 47 is shut off. When the telescoping tray 41 is in the closed position, vents 43 and 47 are aligned, thereby diverting the air flow through the bench vent 47. By extending the tray 41, air flow is directed through vent 43.

Sealing means 42 may be provided on the front structural portion 19 respectively, so that when a hinged counter portion, such as used in work stations 20, 70 and 110, are closed, the leading edge of the hinged counter portion will contact the sealing means 42 and prevent a leakage of the vacuum through the closed work station. Of course, while sealing means 42 is shown as a resilient strip of material, such as felt or the like, any other means for sealing the drawer may be used providing that the purpose of preventing the loss of vacuum is effected when the drawer is closed.

The countertop exhaust vent 47 allows a technician-operator to rest his arms on either the countertop or the extended drawer, thereby providing more support and stability to the technician-operator when polishing and grinding. By forming the vent as an integral part of the countertop, the technician-operator may more conveniently place tool, utensils, reagents and the like on the counter within easy reach. The telescoping air chamber 40, when used in combination with a countertop vent 47, gives the technician complete flexibility in adapting the work area to his particular work habits and yet retain his utensils in a safe and convenient location for easy access.

The countertop hood 70 includes an upper counter portion 76 which is pivotable about hinge 77 near the rear of the counter 98 so that it may be raised upwardly about the hinge 77 and lay flat at the rear of the counter 98. When the countertop portion 76 is in the open position, as shown in FIGS. 9 and 10, an exhaust port 78 is exposed which communicates through internal passageway 79 with the inlet adapters 52 of the base 50, thus allowing the flow of the dust-laden air from the grinding and polishing operations within the countertop hood work area 73 to be carried through the exhaust port 78, the conduit 79 and into the base unit 50. If desired, a perforated screen 74 may cover the exhaust port 78 to allow the flow of air, while preventing the entry of tools, tissues, or other foreign matter which might harm the filtering system.

Each working station, the lathe exhaust hood 20, the telescoping exhaust vent 40, and the countertop exhaust hoods 70 and 110 may be used independently of the other on the same laboratory bench 100 when each individual work station is not in use and is in the closed position. The exhaust flow is diverted from the closed work stations to the work station in use. Thus, no exhaust flow is wasted to decrease the air velocity and efficiency of the filtering unit. While the work stations are shown and described as being coordinated into one bench structure, each work station may comprise the sole station at a laboratory bench or may be coordinated with other like work stations to constitute a laboratory bench having, say, six lathe and exhaust hood stations or whatever combination of work stations desired.

In addition to the work stations which may be retracted into the bench to provide a clean, unobstructed countertop for a safer and more efficient working area, the bench of the subject invention includes a means for restricting the number and length of electric cords used to power and control the various utensils and tools normally used in laboratory work. The outlets 91 of the subject invention, which are used to provide a source of power to these various utensils, are mounted on the rear of a hinged panel which is pivotally secured to the vertical counter portion 95 linking the bench countertop 98 with the reagent shelf 97. A small, preferably one-half inch space is left at the top of the panel 90 between the panel and the reagent shelf 97. This allows entry of the electric power cords of the various utensils to the rear of the panel 90 for access to an outlet 91. In this manner, the extra lengths of cords not being used may be hidden behind the panel 91, where they will not be in the way. Thus, dangerous situations may be avoided, such as the tripping of a flask containing a liquid solution by the inadvertant movement of a long coiled cord. The countertop 98 is kept clear as well, to provide additional working surface.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A laboratory bench assembly for the collection of dust resulting from grinding and polishing operations by a lathe mounted at a work station on said bench, said bench including a frame, an enclosed bench, a countertop, an exhaust vent, said countertop including a pivotal portion, said pivotal portion being movable from a first closed position to a second open position to expose said exhaust vent and allow the flow of air through said exhaust vent, a blower means for creating an air flow between said exhaust vent and said blower means, filter means intermediate said blower means and said exhaust vent for cleaning said air flow, said exhaust vent being connected to said filter means by conduit means when exposed by said open position of said countertop portion, said air flow thereby carrying said dust particles from said grinding operation at said bench through said conduit means to be collected in said filter means, said pivotal portion comprising first and second mounting plates joined in fixed angled relation to each other along a horizontal axis and forming a lathe mount pivotal about said horizontal axis, said first mounting plate supporting said lathe, a second mounting plate concealing said lathe and said exhaust vent when in said first closed position and forming a rear barrier in said second open position, said first mounting plate and said second mounting plate moving from said second open position to said first closed position in a following concurrent fashion, said lathe used in conjunction with said exhaust vent when in said open position, said air flow created by said blower means drawing said dust particles generated in the use of said lathe in grinding and polishing operations through said conduit means and into said filter means.

2. The laboratory bench assembly of claim 1 wherein said filter means are cleaned to extend their useful life by actuating a jet means associated therewith to direct a blast of air through said filter means, thereby dislodging particles of dust from said filter means, said dust thereafter settling by gravity on a collection pan.

3. A laboratory bench assembly for the collection of dust resulting from grinding and polishing operations by a lathe mounted at a work station on said bench, said bench including a frame, a bench, a countertop, an exhaust vent, said bench including a movable portion movable from a first closed position to a second open position to expose said exhaust vent and allow the flow of air through said exhaust vent, a blower means for creating an air flow between said exhaust vent and said blower means, filter means intermediate said blower means and said exhaust vent for cleaning said air flow, said exhaust vent being connected to said filter means by conduit means when exposed by said open position of said countertop portion, said air flow thereby carrying said dust particles from said grinding operation at said bench through said conduit means to be collected in said filter means, said movable bench portion comprising a telescoping air chamber, said telescoping air chamber having a first air chamber fixedly mounted within said bench, a first exhaust vent, a second exhaust vent, a second air chamber mounted to said first air chamber in a telescopic manner for movement from a first position to an extended second position, said first exhaust vent being in said second air chamber whereby the telescopic movement of said second air chamber to said extended second position allows an air flow through said first exhaust vent, and the telescopic movement of said second air chamber to said first position prevents air flow through said first exhaust vent, a portion of said countertop over said second air chamber being pivotable to an open countertop position to expose said second exhaust vent, said exposed second exhaust vent communicating with said second air chamber in said first position to allow the flow of air whereby an operator may direct the flow of air through one of said first and second exhaust vents as desired, for utilization of either exhaust vent without diminishing the flow of air through the vent in use.

4. A laboratory bench assembly for the collection of dust resulting from grinding or polishing operations in lathe and hand grinding operations conducted at said bench assembly, said bench assembly including a frame, an enclosed bench, a countertop, an exhaust means, a blower means for creating an air flow between said exhaust means and said blower means, filter means intermediate said blower means and said exhaust means for cleaning said air flow, said exhaust means being connected to said filter means by conduit means when exposed by said open position of said countertop portion, said air flow thereby carrying said dust particles from said grinding operation at said bench through said conduit means to be collected in said filter means, said exhaust means including a first exhaust compartment and a second exhaust compartment, said first exhaust compartment having a first vent opening, said second exhaust compartment having a second vent opening and mounted to said first exhaust compartment in telescopic fashion to allow said exhaust compartment to move from a retracted position where said first vent opening is open for the flow of air and said second vent opening is closed to the flow of air, to an extended position where said second vent opening is closed to the flow of air and said first vent opening is open to the flow of air.

5. In a laboratory bench assembly for the collection of dust particles generated at a polishing and grinding operation at a work station of said bench assembly, a collection pan, a blower means for creating an air flow within said bench, a filter means for cleaning said air flow, a first conduit means connecting said filter means with said work station, a second conduit means connecting said blower means with said filter means, whereby dust particles generated at said work station through said grinding and polishing operation may be drawn by said air flow through said first conduit means and collected in said filter means, and a means for forcing a momentary blast of air through said filter means to dislodge a portion of said dust particles from said filter means onto said collection pan, thereby cleaning said filter means and collecting said dust particles for regeneration, said blasting means being operated concurrently with a valve means in said first conduit means adjacent said blasting means, said valve means being automatically movable from a normally open position to a closed position to restrict the back flow of dust particles from said filter means into said first conduit means while said blasting means is operated.

6. In a laboratory bench assembly for the collection of dust particles generated in a polishing and grinding operation conducted about a work station in said bench assembly, said work station comprising a horizontal countertop, at least one exhaust hood communicating with a blower means for providing an air flow to carry said dust particles from said exhaust hood to said blower means, said air flow being directed by a conduit means through a filter means for cleaning said air flow, said exhaust hood comprising an opening in said countertop of said bench, said opening allowing said dust particles to be carried by said air flow through said opening to be collected in said filter means, said countertop having a first stationary portion and an integral second pivotable portion, said second portion of said countertop being hingedly connected to said first portion of said countertop, said second portion being pivotally movable from a first open position exposing said opening for the flow of air through said opening to said second closed position shutting off the flow of air through said opening.

7. The laboratory bench assembly of claim 6 wherein said opening comprises a plurality of perforations to allow the entrance of said dust carried by said air flow and exclude larger foreign matter capable of rendering said filter means ineffective.

* * * * *